US008554836B1

(12) United States Patent
Wilson et al.

(10) Patent No.: US 8,554,836 B1
(45) Date of Patent: Oct. 8, 2013

(54) SHARING SOFTWARE APPLICATIONS

(75) Inventors: Thomas Blake Wilson, Mountain View, CA (US); Haruyoshi Sakai, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 13/488,274

(22) Filed: Jun. 4, 2012

(51) Int. Cl.
*G06F 15/16* (2006.01)
(52) U.S. Cl.
USPC .......................................... 709/203; 709/219
(58) Field of Classification Search
USPC .......................................................... 709/203
See application file for complete search history.

(56) References Cited

U.S. PATENT DOCUMENTS

| 8,285,837 | B2 * | 10/2012 | Sanford et al. | 709/224 |
|---|---|---|---|---|
| 2006/0143081 | A1 * | 6/2006 | Argaiz | 705/14 |
| 2006/0224721 | A1 * | 10/2006 | Rowe et al. | 709/224 |
| 2007/0043583 | A1 * | 2/2007 | Davulcu et al. | 705/1 |
| 2009/0319351 | A1 * | 12/2009 | Soza et al. | 705/14.13 |
| 2010/0042471 | A1 * | 2/2010 | Chang et al. | 705/10 |
| 2010/0325646 | A1 * | 12/2010 | Alhadeff et al. | 725/10 |
| 2011/0218846 | A1 * | 9/2011 | Fieldman et al. | 705/14.16 |
| 2011/0282722 | A1 | 11/2011 | Chopra et al. | |
| 2011/0288912 | A1 | 11/2011 | McCrea et al. | |
| 2011/0288970 | A1 | 11/2011 | Kidron et al. | |
| 2011/0320284 | A1 * | 12/2011 | Tennenholtz et al. | 705/14.69 |
| 2012/0035990 | A1 * | 2/2012 | Lewis et al. | 705/14.1 |
| 2012/0221387 | A1 * | 8/2012 | Liu et al. | 705/14.16 |
| 2012/0316940 | A1 * | 12/2012 | Moshfeghi | 705/14.16 |

OTHER PUBLICATIONS

"Enterprise Partner Feed Relational." Apple, Inc. Archived by the Internet Archive on May 19, 2011: <http://web.archive.org/web/20110519005633/http://www.apple.com/itunes/affiliates/resources/documentation/itu nes-enterprise-partner-feed.html>. pp. 1-23.*
"Advanced Affiliate Linking." Apple, Inc. Archived by the Internet Archive on May 10, 2011: <http://web.archive.org/web/20110510123746/http://www.apple.com/itunes/affiliates/resources/documentation/l inking-to-the-itunes-music-store.html>. pp. 1-9.*
Grigsby, Dan. "Connecting Click-Throughs to App Sales." Feb. 19, 2009. <http://mobileorchard.com/connecting-click-throughs-to-app-sales/>. pp. 1-3.*
"Alau.me—An iOS App Referral Tracking Platform." Alau.me. Archived on Apr. 13, 2012 by the Internet Archive: <http://web.archive.org/web/20120413234126/http://alau.me/home/description>. pp. 1-2.*

\* cited by examiner

*Primary Examiner* — Christopher Biagini
(74) *Attorney, Agent, or Firm* — Shumaker & Sieffert, P.A.

(57) ABSTRACT

In general, this disclosure describes techniques for providing a mechanism to manage referrals for applications shared over a social network service when granted permission by users of the social network service. For example, a server system receives a message including user association information and an indication of a software application, and publishes a post to a subset of users as indicated by the user association information. The server system also receives a request for a version of the software application from a second user and determines whether the post was re-shared by a third user. If the post was re-shared, the server system stores in a database of the computing system, a referral association between the third user, the second user, and the software application. If the post was not re-shared, the server system stores a referral association between the first user, the second user, and the software application.

20 Claims, 7 Drawing Sheets

SHARING SOFTWARE APPLICATIONS

TECHNICAL FIELD

This disclosure relates to distributing software applications using one or more computing devices.

BACKGROUND

Software application developers may distribute software applications (e.g., games, e-readers, productivity applications) using an online store or physical retail store. However, software application developers may have difficulty making users aware of the software applications without significant advertising, which may cause some developers to rely upon word-of-mouth recommendations from users who purchased the software application. The users may recommend the software applications by word of mouth or other conventional communication methods without the software application developers being aware of the recommendations. More recently, social network services have provided another mechanism by which users can recommend software applications. When users of the social network services elect to make posts publicly available, the software application developers may be given more insight into who is recommending the software applications.

SUMMARY

In one embodiment, a method includes receiving, by a server system and from a computing device associated with a first user, a message that includes (1) user association information and (2) an indication of a software application executable by the computing device, wherein the user association information identifies a subset of users and publishing, by the server system a post to the subset of users indicated by the user association information, wherein the post is based at least in part on the message. The method may also include receiving, by the server system, a request for a version of the software application from a second user who is a member of the subset of users, determining whether the post was re-shared by a third user, and responsive to determining that the post was not re-shared by the third user, storing, in a database of the server system, a referral association between the first user, the second user, and the version of the software application. The method may further include, responsive to determining that the post was re-shared by the third user, storing, in the database, a referral association between the third user, the second user, and the version of the software application.

In another embodiment, a server system includes one or more computing devices, a database, and at least one application. The at least one application is operable to provide instructions to the one or more computing devices to receive, from a computing device associated with a first user, a message that includes (1) user association information and (2) an indication of a software application executable by the computing device, wherein the user association information identifies a subset of users. The at least one application is also operable to provide instructions to the one or more server computers to publish a post to the subset of users indicated by the user association information, wherein the post is based at least in part on the message, receive one or more eligibility criteria, receive a request for a version of the software application from a second user who is a member of the subset of users, determine that the request for a version of the software application satisfies at least one eligibility criterion of the one or more eligibility criteria, and determine whether the post was re-shared by a third user. The at least one application is also operable to provide instructions to the one or more server computers to, responsive to determining that the post was not re-shared by the third user, store, in the database, a referral association between the first user, the second user, and the version of the software application and, responsive to determining that the post was re-shared by the third user, store, in the database, a referral association between the third user, the second user, and the version of the software application.

In another embodiment, a computer-readable storage medium is encoded with instructions that, when executed, cause one or more processors of a server system to perform operations that include receiving, by the server system and from a computing device associated with a first user, a message that includes (1) user association information and (2) an indication of a software application executable by the computing device, wherein the user association information identifies a subset of users. The operations may further include publishing, by the server system, a post to the subset of users indicated by the user association information, wherein the post is based at least in part on the message, and receiving, by the server system, a request for a version of the software application from a second user who is a member of the subset of users. The operations may further include determining whether the post was re-shared by a third user, and, responsive to determining that the post was not re-shared by the third user, storing, in a database of the server system, a referral association between the first user, the second user, and the version of the software application. The operations may also include, responsive to determining that the post was re-shared by the third user, storing, in the database, a referral association between the third user, the second user, and the version of the software application In another embodiment, a method includes receiving, by a server system, requests for a version of a software application associated with a software application developer, wherein each request is received via one of a plurality of referral sources, identifying a first user that shared at least a portion of the plurality of referral sources, each to a respective subset of users, and identifying a second user that initiated at least one of the requests. The method further includes determining that for each request, the second user is a member of the respective subset of users and providing, to the application developer, information about the first user, the second user, and the requests received via the portion of referral sources that are shared by the first user.

The details of one or more embodiments are set forth in the accompanying drawings and the description below. Other features, objects, and advantages will be apparent from the description and drawings, and from the claims.

DETAILED DESCRIPTION

Figure 1:
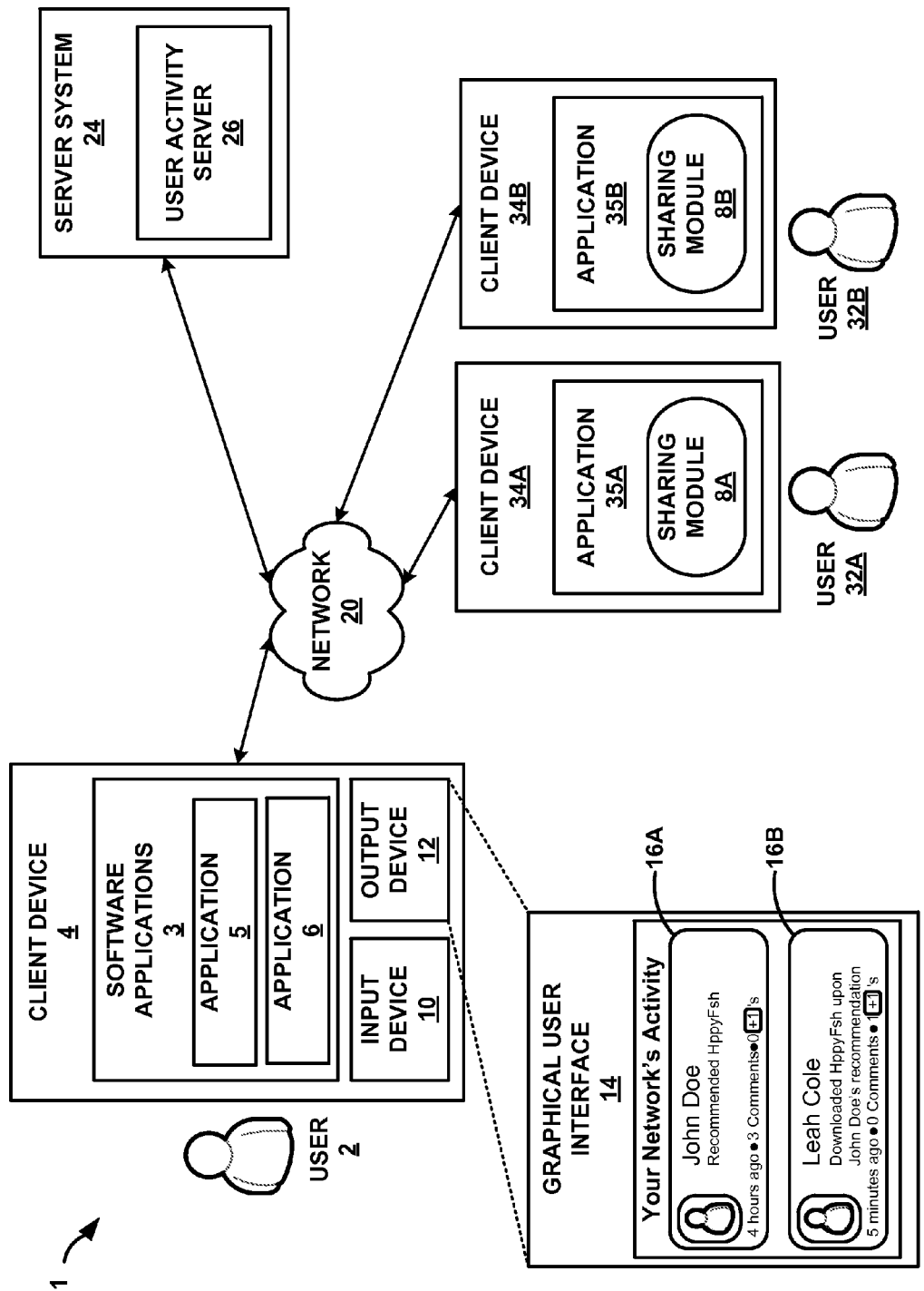
FIG. 1 is a conceptual diagram illustrating an example network system that may be used to manage a sharing of software applications using social network services, in accordance with one or more aspects of the present disclosure.

Given the number of applications available for various mobile platforms, software application developers often have difficulty making potential customers aware of their applications. Typically, a large percentage of applications are discovered from user recommendations. However, recommendations are typically most useful if users can interact with their friends when the users are actually using and thinking about the application. Further, software application developers do not currently have a way to track that a particular application install resulted from a recommendation. Because of the lack of referral management functionality, developers may not be able to implement an effective referral incentive for their users.

Techniques of this disclosure provide a mechanism usable by software application developers to manage referrals and control referral incentives for applications shared over a social network service when granted permission by users of the social network service. For example, developers may utilize an application programming interface (API) that leverages the user information and other resources of the social network service in accordance with techniques of this disclosure. The developer may incorporate the API into the application such that the application enables a user of the application to easily create a social network service post and share it to a selected audience. The post includes user created content (e.g., a message from the user) as well as developer created content (e.g., a description of the application, an image, a link to the application, etc.). When another user (i.e., a user other than the one who generated the post) selects the post, the other user may be provided with a download link for the application. The download link may be for the same application, or may be for a similar application. For example, the download link may be for an updated version of the application, or the same application executable by a different operating system. When the other person accesses the link, downloads the application using the link, and/or installs the application using the link, the social network service establishes a referral association between the two users. This referral association identifies the install of the application by a user as resulting from a referral by the user who originally generated the post on the social network service. The referral association may then be provided to the software application developers who may, for example, implement a referral reward program for users who generate installs based on referrals made by the users.

By leveraging the user authentication, information, and grouping provided by the social network service, detailed referral information may be provided to developers (e.g., demographic information, the number of people who clicked on a link in the post about the application but did not install the application, etc.). Further, the developer may take advantage of the user authentication mechanisms provided by the social network service to restrict access to referral rewards programs. For example, the social network service may provide the developer with the ability to limit the rewards programs to the people with whom the original post about the application was shared. As another example, the social network service may provide a mechanism to limit promotions to a particular number of redemptions per authenticated user and may prevent unauthenticated users from redeeming a promotion.

FIG. 1 is a conceptual diagram illustrating an example network system 1 that may be used to manage a sharing of software applications using social network services, in accordance with one or more aspects of the present disclosure. System 1 includes client devices 4, 34, and server system 24, which includes user activity server 26. Client device 4 is one example of a computing device and includes input devices 10, output device 12, and software applications 3. Software applications 3 include application 5 and application 6. Application 6 may cause output device 12 to display graphical user interface (GUI) 14, which includes social network activity entries 16A-16B (collectively, "social network activity entries 16"). Client devices 34A-34B (collectively, "client devices 34") are computing devices similar to client device 4. Client devices 34 may include respective applications 35A-35B (collectively, "applications 35").

Each of client devices 4, 34 and server system 24 may be operatively coupled by network 20. Network 20 may include wired or wireless networks or both. For example, network 20 may include a wide-area network such as the Internet, a local-area network (LAN), a wireless local-area network (WLAN), an enterprise network, or one or more other types of networks. In some examples, network 20 may include one or more different networks. For instance, client device 4 and server system 24 may communicate using a WLAN, and client devices 34 may communicate with server system 24 using the Internet.

Examples of server system 24 may include a personal computer, a laptop computer, a handheld computer, a workstation, a data storage system, a supercomputer, or a mainframe computer. A server system 24 may execute with multiple processors, may have functionality distributed across multiple machines, etc. Server system 24 may also execute as a virtual machine executing on underlying hardware (which itself may be a single machine or multiple machines). Server system 24 may also execute as a process, or a set of processes, on a cloud server or service.

Examples of client devices 4, 34 may include, be, or be part of a mobile computing device (e.g., a mobile phone, netbook, laptop, personal digital assistant (PDA), tablet computer, portable gaming device, portable media player, e-book reader, or watch) or other computing devices (e.g., a desktop computer, set top box, or television with one or more processors attached thereto or embedded therein). Each of client devices 4, 34 may be the same or different types of devices. For example, client device 4 and client device 34A may both be mobile phones. In another example, client device 4 may be a mobile phone and client device 34A may be a desktop computer.

Client devices 4, 34 may include one or more input devices 10. Input devices 10 may include keyboards, pointing devices, microphones, presence-sensitive screens, and cameras capable of recording one or more images or video, as non-limiting examples. Client devices 4, 34 may also include one or more output devices (e.g., output device 12 of client device 4). Examples of output device 12 may include a video graphics card, computer display, sound card, presence-sensitive screen, and speakers.

Client device 4 may include one or more software applications 3. Some of software applications 3 (e.g., application 6) may include mobile or desktop computer applications, such as social network service applications, web-based social network service interfaces, or other methods of viewing and interacting with social network service content. Application 6 may cause output device 12 to display GUI 14. GUI 14 may include graphical elements, such as social network activity entries 16. Graphical elements may include any visually perceivable object that may be displayed in GUI 14. Examples of graphical elements may include a background image, video feed, text, control buttons, input fields, or scroll bars. Social network activity entries 16 correspond to user activity generated by other users within a social network of user 2. In other words, user 2 may be a member of one or more social network services and activity of other users of the social network services may be published to a user account of user 2 at the social network services.

For example, social network activity entry 16A includes user activity information generated by a user named "John Doe" (e.g., user 32A). Social network activity entry 16A indicates that user 32A recommended a software application titled "HppyFsh" (e.g., application 35A) approximately four hours ago. Since the time at which social network activity entry 16A was published (i.e., in the last four hours), various users commended on social network activity entry 16A three times and no one +1'd the entry. As another example, social network activity entry 16B includes user activity information generated by a user named "Leah Cole" (e.g., user 32B). Social network activity entry 16B indicates that user 32B downloaded the software application titled "HppyFsh" upon user 32A's software application recommendation five minutes ago and one person +1'd her comment. In various instances, user activity associated with user 2 may also be included within GUI 14.

User activity information may be generated by applications similar to application 6. User activity information may also be generated using other applications (e.g., applications 5, 35). In some examples, applications 35 may automatically generate user activity information. For example, user 32B may give application 35B permission to create social network activity entries without requiring user 32B to create or submit an entry. That is, upon user 32B opting to allow automatic generation of user activity information, software application 35B may generate user activity information in response to detecting a certain condition (e.g., user 32B downloading software application 35B). In other examples, software apps 35 may enable users 32 to personally create user activity information. That is, user activity information may contain content authored both by a software application, such as application 35A or 35B, as well as by a user, such as user 32A or 32B.

User activity may refer to downloading a software application, using a software application, promoting a software application to others, sharing a software application, rating a software application, or otherwise interacting with a software application, such as software apps 5, 34. That is, user activity information includes user interactions with software applications. In at least some implementations, user activity information may comprise one or more of: (1) a user identifier (e.g., user name, identification code, etc.) that identifies a user that performed the user activity, (2) a software application identifier (e.g., title, developer name, identification code, etc.) that identifies a software application associated with the user activity, (3) an action identifier that identifies one or more actions (e.g., download, review, purchase, promote, rate, etc.) performed with respect to the software application, (4) a time identifier that identifies a time at which the one or more actions were performed, (5) a platform identifier that identifies a type of device (e.g., mobile phone, desktop computer, etc.) utilized to perform the one or more actions, (6) user association information (e.g., whom the user intends to share the user activity with), (7) other suitable information.

Software apps 35 may have sharing modules 8A, 8B (collectively, "sharing modules 8"). Sharing modules 8 may enable software apps 35 to interact with user activity server 26 running on server system 24. For example, sharing modules 8 may enable users 32 to associate their respective software apps 35 with the users' various social network service accounts (i.e., by providing login credentials). Furthering this example, users 35 could then interact with software apps 35 to allow user activity server 26 to publish user activity information at one or more social network services and establish referral associations.

In some examples, sharing modules 8 may include a plug-in for software apps 35. For example, users 32 may download sharing modules 8 from server system 24 or other source as a plug-in for software apps 35. In other examples, sharing modules 8 and/or software apps 35 may reside at a server that is remote from client devices 4, 34 whereby users 32 may operate client devices 34 to interact with the remote software apps via network 20. Accordingly, sharing modules 8 may reside at any suitable location or combination of locations in a computing network. In at least some implementations, sharing modules 8 may include an application programming interface (API) that enables other computer applications or programs (such as user activity server 26 or other suitable resource) to receive user activity information from sharing modules 8 or to provide user association information to sharing modules 8.

User activity information generated by application 35A may be sent by sharing module 8A from client device 34A to server system 24. User activity server 26 may publish the user activity information or a portion thereof at a social network service in accordance with the user association information included in the user activity information. For instance, user 32A may operate application 35A to recommend or otherwise interact with application 35A. Application 35A may generate user activity information and sharing module 8A may send at least a portion of the user activity information (e.g., a message that indicates that user 35A recommended the software application to one or more users) to server system 24 via network 20. In some examples, in addition to, or instead of sending the user activity information to server system 24, the user activity information generated by application 35A may be stored locally at client device 34A.

User activity server 26 may be configured to receive user activity information from one or more of client devices 4, 34 and publish, at a social network service, a social network activity entry based on at least a portion of the received user activity information. Published social network activity entries may be displayed to a subset of users of a social network service as defined by user association information, included in the user activity information, linking users in the social network. In some examples, user activity server 26 may receive user association information from users of a social network service via respective clients. User activity server 26 may utilize user association information to control display of social network activity entries among users of the social network service. The user association information may specify a subset of the users of the social network service to which the social network activity entry should be displayed (i.e., enable a subset of the users of the social network service to view the user activity information) or may specify that the social network activity entry should be displayed to all of the users of the social network (i.e., enable all of the users of the social network to view the user activity information). In general, the user association information specifies one or more groups of users to which the social network activity information should be displayed or otherwise made available. The groups of users may include all users of one or more social network services or a subset of the users of the one or more social network services.

In some examples, user activity server 26 may utilize previously received user association information (i.e., user association information that was provided to user activity server 26 prior to the time when user activity server 26 receives the user activity information from one of client devices 4, 34) to control the publication of the social network activity entry. That is, in some examples, prior to generating user activity information, a user (e.g., user 32A) may provide a default group of users with whom to share any subsequent social network activity entries. User 2 may override, modify, or otherwise change the previously provided user association information by, for example, providing new user association information at or about the same time as generating new user activity information.

User 32A may also provide different user association information for each different social network service, and/or for each different type of activity taken by user 32A with respect to software applications. For example, user 32A may provider user association information that specifies that a first group of users (e.g., a friend group) should receive social network activity entries about games that user 32A is playing and provide different user association information that specifies that a second group of users (e.g., a coworker group) should receive social network activity entries about productivity applications user 32A has purchased. As another example, user 32A may provide user association information to specify various groups of users that may receive social network activity entries about purchased software applications, installed software applications, and/or deleted software applications. The groups of users may include users that all belong, subscribe, or are otherwise members of one social network service or that span two or more different social network services (e.g., where a first user of the group belongs to a first social network service and a second user of the group belongs to a second social network service). That is, each user of a group of users may belong to one or more social network services.

In other examples, such as when no user association information has been previously provided by a user, user activity server 26 may cause sharing module 8A of application 35A to display, on an output device, a request for user association information. User 32A may then provide the user association information to control the publication of the generated user activity information.

User activity server 26 may also be configured to establish referral associations between users. Referral associations may be stored at user activity server 26, at client devices 4, 34, or any other suitable location. In some examples, user activity server 26 may receive user activity information from each user of a social network via respective clients. In other examples, user activity server 26 may receive user activity information from various social networking services.

Software apps 5, 35 may access user activity server 26 to verify or determine referral associations and provide users with incentives (e.g., rewards) accordingly. As one example, user 32A may operate application 35A to cause sharing module 8A to send user activity information regarding application 35A to user activity server 26 (e.g., user 32A recommends application 35A). User activity server 26, in addition to publishing a social post, may store this information and/or establish a partial referral association. Thereafter, user 2 may interact with user 32A's social network activity entry (e.g., social network activity entry 16A) by operating social application 6 on client device 4 and download a copy of application 35A. In some instances, the copy of application 35A may be exactly the same as application 35A. In other instances, the copy of application 35A may be slightly different from 35A (e.g., the copy may be computer code compiled to run on a different operating system). That is, the copy of application 35A may be a different version of application 35A. By interacting with social network activity entry 16A, user 2 may also send user activity information to the social network service or to server system 24.

The social network service or server system 24 may forward the user association information received from user 2 to user activity server 26. After receiving user activity information pertaining to user 2's interaction with social network activity entry 16A, user activity server 26 may determine whether user 2 is one of the users to whom user 32A recommended application 35A. User activity server 26 may use stored user association information to determine whether user 2 is one of the users with whom user 32A recommended application 35A. That is, user activity server 26 may determine whether user 2 is included in the user association information that was provided by user 32A as part of the user activity information used to publish social network activity entry 16A. User activity server 26 may establish a referral association using user activity information pertaining to user 32A's social network activity entry 16A and the user activity information pertaining to user 2's interaction with social network activity entry 16A. In some examples, this referral association may only be established if user 2 is verified as one of the users to whom user 32A recommended application 35A. In other words, user activity server 26 may only establish a referral association if the user association information, received from user 32A and used by user activity server 26 to publish social network activity entry 16A, includes user 2.

After downloading an instance of application 35A, user 2's instance of application 35A may communicate with user activity server 26 to access or verify the existence of a referral association. Upon verification of the existence of a referral association, user 2's instance of application 35A may, for example, provide a financial rebate to user 2, reducing the cost of application 35A for user 2. As another possible outcome, user 32A's instance of application 35A may access user activity server 26 and provide a financial rebate to user 32A. In addition, referral associations created by user activity server 26 for a software application (e.g., application 35A) may be aggregated and provided to a software application developer of the software application. In this way, user activity server 26 may provide a way to determine what software applications are shared on social network services by what users and with whom.

Figure 2:
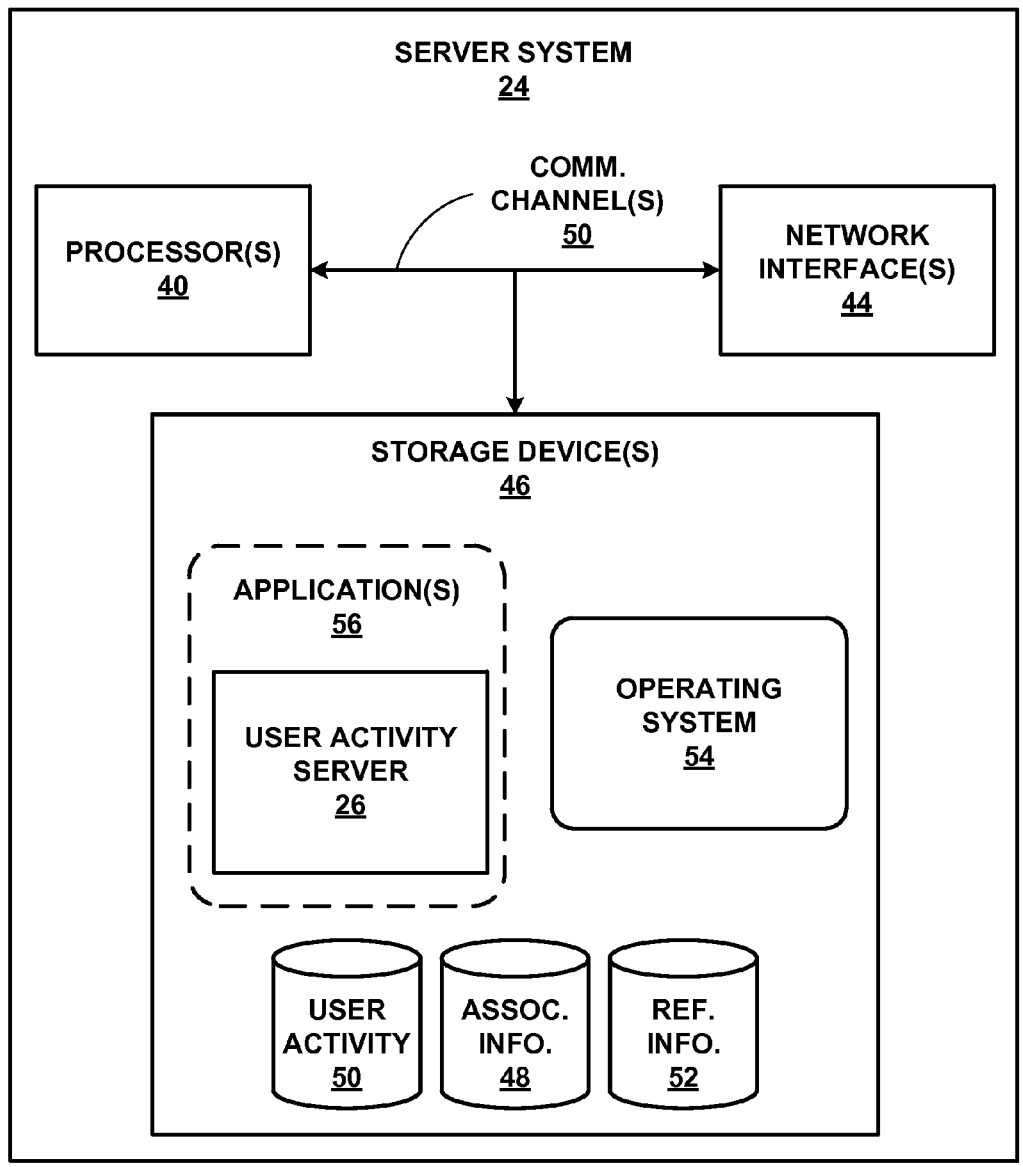
FIG. 2 is a block diagram illustrating an example computing device that may be used to manage a sharing of software applications using social network services, in accordance with one or more aspects of the present disclosure.

FIG. 2 is a block diagram illustrating an example computing device that may be used to manage a sharing of software applications using social network services, in accordance with one or more aspects of the present disclosure. FIG. 2 illustrates only one particular example of server system 24, and many other example embodiments of server system 24 may be used in other instances. As shown in the specific example of FIG. 2, server system 24 includes one or more processors 40, one or more network interfaces 44, and one or more storage devices 46. Server system 24 also includes an operating system 54 which may include modules that are executable by server system 24. Server system 24, in one example, further includes user activity server 26. Each of components 40, 44, 46, 54, and 26 may be interconnected (physically, communicatively, and/or operatively) for inter-component communications. In some examples, communication channels 50 may include a system bus, network connection, interprocess communication data structure, or any other channel for communicating data. As one example in FIG. 2, components 40, 44, and 46 may be coupled by one or more communication channels 50.

One or more processors 40, in one example, are configured to implement functionality and/or process instructions for execution within server system 24. For example, processors 40 may be capable of processing instructions stored in one or more storage devices 46.

One or more storage devices 46, in one example, are configured to store information within server system 24 during operation. Storage device 46, in some examples, is described as a computer-readable storage medium. In some examples, storage device 46 is a temporary memory, meaning that a primary purpose of storage device 46 is not long-term storage. Storage device 46, in some examples, is described as a volatile memory, meaning that storage device 46 does not maintain stored contents when the computer is turned off. Examples of volatile memories include random access memories (RAM), dynamic random access memories (DRAM), static random access memories (SRAM), and other forms of volatile memories known in the art. In some examples, storage device 46 is used to store program instructions for execution by processors 40. Storage device 46, in one example, is used by software or applications running on server system 24 (e.g., applications 56) to temporarily store information during program execution.

One or more storage devices 46, in some examples, also include one or more computer-readable storage media. One or more storage devices 46 may be configured to store larger amounts of information than volatile memory. One or more storage devices 46 may further be configured for long-term storage of information. In some examples, one or more storage devices 46 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

As shown in FIG. 2, storage devices 46 include association information data repository (ASSOC. INFO.) 48, user activity data repository 50, and referral information data repository (REF. INFO.) 52. Association information data repository 48, user activity data repository 50, and referral information data repository 52 may each be configured as a database, flat file, table, or other data structure stored within storage devices 46 of server system 24. In some examples, association information data repository 48, user activity data repository 50, and referral information data repository 52 may be configured as separate data repositories while, in other examples, they may be a part of a single data repository.

Server system 24, in some examples, also includes one or more network interfaces 44. Server system 24, in one example, utilizes one or more network interfaces 44 to communicate with external devices via one or more networks, such as one or more wireless networks. One or more network interfaces 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server system 24 utilizes network interface 44 to wirelessly communicate with an external device such as client devices 4, 34 of FIG. 1, a mobile phone, or other networked computing device.

Server system 24 may include operating system 54. Operating system 54, in some examples, controls the operation of components of server system 24. For example, operating system 54, in one example, facilitates the interaction of user activity server 26 with processors 40, network interface 44, and storage device 46. Applications 56 and user activity server 26 may each include program instructions and/or data that are executable by server system 24. For example, user activity server 26 may include instructions that cause server system 24 to perform one or more of the operations and actions described in the present disclosure.

In accordance with aspects of the present disclosure, user activity server 26 may receive user activity information from client devices 4, 34 of FIG. 1. The received user activity information may include user association information. For example, upon installation or configuration of sharing module 8A at client device 34A, user 32A may provide user association information. The user association information may specify one or more social network services (e.g., Google+, Facebook, LinkedIn, etc.), provide user identification and authentication information, and may also include information that identifies one or more users that are to receive user activity information. Upon permission from user 32A, user activity module 8A may send the user association information to server system 24, which may, in turn, provide the user association information to user activity server 26. User activity server 26 may receive the user association information and store it within association information data repository 48. In general, association information data repository 48 may be configured to store any type of user association information received from one or more different client devices (e.g., client devices 4, 34).

In examples where user authentication information is included within the user association information received by user activity server 26, user activity server 26 may use the user association information and/or the user authentication information received from a user (e.g., user 2) to configure a user account associated with the user. As one example, user activity server 26 may receive user 2's identification information and user authentication information from device 4. User activity server 26 may send the received user authentication information to a social network service specified in the user identification information in order to authenticate at the social network service.

User activity server 26 may receive user activity information from one or more client devices, or user activity server 26 may generate user activity information on its own. User activity server 26 may publish at least an indication of user activity information at one or more social network services. When publishing the user activity information, User activity server 26 identifies any social network services for which it has received user authentication information and/or at which it has already authenticated. User activity server 26 may then publish at least a portion of the user activity information at the social network services on behalf of the user and without requiring the user to take further actions to cause the user activity information to be published. In some examples, when publishing user activity information for a first time at each social network service, user activity server 26 may send a command to sharing module 8A to cause a notification and/or request for authorization to be displayed on an output device similar to output device 12.

User activity server 26 may also publish the user activity information other than at a social network service. For example, when the user association information includes information about one or more other users (e.g., an email address, instant messaging username, phone number, etc.), user activity server 26 may text, email, call, message, or otherwise publish the user activity information to the users specified in the user association information. In examples where social network service information as well as information about one or more other users are both included in the user association information received by user activity server 26, user activity server 26 may both publish the user activity information at the social network services and send the user activity information to the other users in a manner determined based on the information about the other users.

In addition to storing and sharing the user activity information, user activity server 26 may use some or all of the received user activity information to establish or modify a referral association and to store referral association information in the referral information data repository 52. In general, referral information data repository 52 may be configured to store any type of referral association information created from user association information and/or user activity information received from one or more different client devices (e.g., client devices 4, 34).

Upon creation of a referral association, user activity server 26 may provide this information to one or more social network services, client devices, or other suitable locations. For example, user 32A may cause application 35A to create user activity information by attempting to create a social network activity entry using sharing module 8A. That is, user 32A may share application 35A with other users 2, 32B. Sharing module 8A may send the user activity information to server system 24. Upon receipt of the user activity information, user activity server 26 may create a partial referral association, having referral association information, and store the partial referral association in referral information data store 52. Subsequently, another user (e.g., user 2 of FIG. 1) may select user 32A's social network activity entry via a software application on another device (e.g., application 6 of client device 4) to view and/or download a new instance of application 35A.

Selection of the social network activity entry by user 2 may generate a request to download a version of the software application and trigger application 6 and/or the social network service to send associated user activity information to user activity server 26. User activity server 26 may then use the partial referral association stored in referral information data store 52 to determine if user 2 is one of the users with whom user 32A shared application 35A. That is, user activity server 26 may determine if user 2's was one of the users identified in the user association information received when user 32A shared application 35A. If user 2 is one of the users with whom user 32A shared application 35A, user activity server 26 may send a response to the social network service indicating that user 2 is authorized to view and/or download a new instance of application 35A. User activity server may also use the user activity information received from social application 6 and/or the social network service to update or otherwise modify the referral association information associated with the published social network activity entry.

The referral association may, upon user 2's selection of the social network activity entry, contain information identifying users 2, 32A, application 35A, and application 6. The referral association may also contain information about the time and date of creation of the social network activity entry by user 32A and the access by user 2, the number of downloads from the social network activity entry of user 32A, incentive eligibility criteria associated with the application and/or the social network activity entry, as well as other relevant information such as demographic information about users 2, 32A.

If user 2 is not one of the users with whom user 32A shared application 35A, user activity server 26 may send a response to the social network service indicating that user 2 is not authorized to access the social network activity entry. The social network service may then redirect user 2 (e.g., to a general download site for application 35A).

User activity server 26 may enable software applications (e.g., applications 5, 35), software application developers, advertisers, or other entities to access referral associations and referral association information. For example, upon installation, application 5 may communicate with user activity server 26 to determine the existence of a referral association to determine if application 5 was downloaded based on a social network activity entry. In response to a request for referral association information, user activity server 26 may determine the existence of a referral association and return a message to application 5. User 32A may have shared application 35A with use 32B and others through a social network activity entry. In other words, user 32A may not have included user 2 in the relevant user association information. User activity server 26 may determine that a referral association between users 32A and 2, for application 35A, does not exist and return an appropriate message to application 5.

When a user selects a social network activity entry, user activity server 26 may receive a request to download a version of the relevant software application, and store a referral association between the sharing user and the selecting user, without regard to whether or not the selecting user was one with whom the sharing user shared the social network activity entry. The referral association may include a validation flag. User activity server 26 may only validate the referral association in those instances where the sharing user included the selecting user in the relevant user association information. For example, user activity server 26 may store a referral association between users 32A and 2, for application 35A, but when receiving the request for referral association information from application 5, user activity server may determine that the referral association information has not been validated, and return an appropriate message to application 5.

When a referral association exists, a software application (e.g., application 35B on device 34B) may receive an appropriate message from user activity server 26. A message indicating the existence of a referral association may cause application 35B to provide some reward to user 32B. In another embodiment, user activity server 26 may instead check for a validated referral association. Upon determining that a validated referral association does exist between users 32A and 32B, for application 35A, user activity server 26 may send an appropriate message to application 35B. The message indicating the existence of a validated referral association may cause application 35B to provide some reward to user 32B. In some examples, providing a reward to user 32B may be accomplished by causing application 35B to communicate with an application server (not shown) configured to manage the purchase of and billing for software applications, such as software apps 5, 35. In addition to or instead of providing a reward to user 32B, user activity server 26 may cause the application that was shared or recommended by a user (e.g., application 35A by user 32A) to provide a reward to the user that shared or recommended the application. That is, user 32A may share application 35A with other users in accordance with the present disclosure. Upon user 2's access of the associated social network activity entry and download of an instance of application 35A (e.g., application 5), application 5 may check the existence or validity of a referral association. Responsive to determining the referral association exists or is validated, user activity server 26 may communicate with application 35A or an application server to cause user 32A to receive some reward (e.g., a monetary discount). In some examples, existence or validation of a referral association may be based on the user association information included in the initial user activity information used to create a social network activity entry. In other words, a referral association may be established if the user who accesses a social network activity entry is identified in the user association information.

Referral association information may include certain incentive eligibility. If the software application or the social network activity entry contains incentive eligibility criteria (e.g., as part of the user association information), user activity server 26 may determine whether a user identified in a referral association complied with at least one of the incentive eligibility criteria. Users (e.g., user 32A), software application developers (e.g., a software application developer of application 35A), and/or social network services may impose incentive eligibility criteria on social network activity entries. Examples of incentive eligibility criteria may include time limitations, type-of-user limitations, number-of-user limitations, and others.

As an example, a software application developer may be able to access user activity server 26 and specify incentive eligibility criteria for that developer's software application. In one embodiment, server system 24 may provide a web-based service to software application developers via network 20. In another embodiment, sharing modules 8 may provide an API for software application developers to utilize in order to specify incentive eligibility criteria. Incentive eligibility criteria specified by a software application developer may take effect on any or all future referral associations created in association with the developer's software application. One such example incentive eligibility criterion includes limiting a reward or other incentive to the first five users to select and download a software application from a specific social network activity entry. User 2 may be the eighth user to select the social network activity entry associated with application 35A. Because user 2 did not satisfy the criteria, the social network service may not provide user 2 with the same access to application 5 as was provided to the first five users. Instead, the social network service may provide user 2 with general access to application 5. After user 2 downloads application 5, application 5 may communicate with user activity server 26 to determine the existence or validation of a relevant referral association. Due to the specified criteria, user activity server 26 may determine that a referral association is nonexistent or not validated, and return an appropriate message to application 5. That is, in some embodiments, user activity server 26 may still establish a referral association between user 32 and user 2, but the referral association may be deemed not validated due to the unsatisfied criteria. For those users who have met all of the criteria specified, the referral server may validate the relevant referral association and return an appropriate message to application 5. The sent message corresponding to a validated referral association may grant the user whose software application receives the message some benefit, such as a discounted purchase price.

In addition to providing users with benefits by managing the sharing of applications via one or more social network services, the present disclosure also contemplates using referral associations and referral association information to enable software application developers and advertisers to access user activity information, user association information, and other relevant information regarding the sharing of applications via social network services. In various embodiments, the user association information stored in user association information data store 48, the user activity information stored in user activity information data store 50, and/or the referral associations stored in referral information data store 52 may be accessed and/or modified by user activity server 26 to provide desired information to software application developers and advertisers. In some examples, user activity server 26 may enable remote access to the referral association information through network 20. In other examples, user activity server 26 may transmit the information to authorized parties. Some of this information may be aggregated before enabling access. That is, information corresponding to specific referral associations may not be provided by user activity server 26, but aggregated information, such as the number of referral associations for specific users, the total number of referrals, the date and time of all referral associations, or other relevant information may be provided. This information may enable a software application developer or advertiser to better understand how social networks affect software application sales and popularity.

Figure 3A:
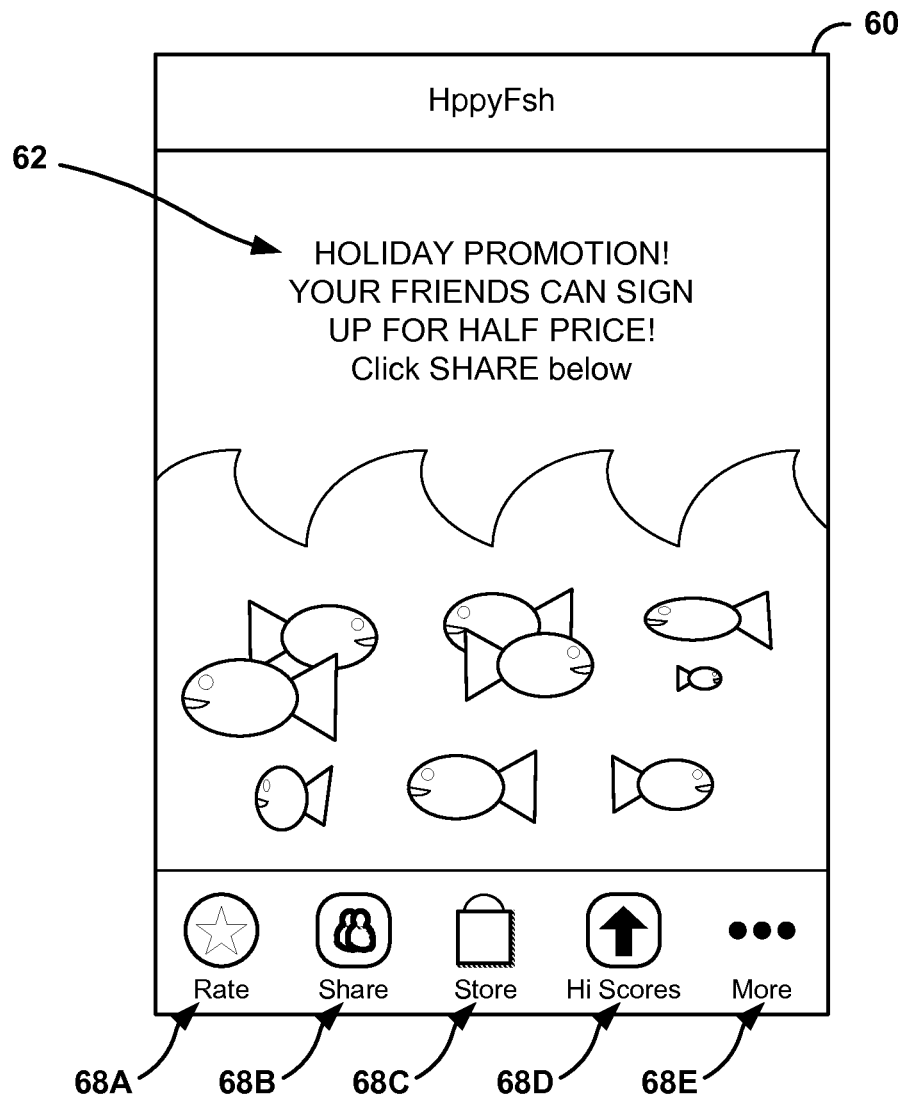
FIG. 3A is a screen illustration showing an example graphical user interface that includes a menu option to share a software application, in accordance with one or more aspects of the present disclosure.

FIG. 3A is a screen illustration showing an example graphical user interface that includes a menu option to share a software application, in accordance with one or more aspects of the present disclosure. For the purposes of illustration only, the example screen illustration is described below within the context of system 1 of FIG. 1 and server system 24 of FIG. 2. As one example, FIG. 3A depicts a GUI 60 that may be configured for a mobile device (e.g., client device 34A) and may comprise part of a software application for a mobile device (e.g., application 35A).

GUI 60 provides an example of application 35A with an associated sharing module (e.g., sharing module 8A) that may enable a user (e.g., user 32A) to share application 35A on one or more social network services. GUI 60 shows, in this example, a promotional message 62, as well as buttons 68A-E (collectively, "buttons 68"). GUI 60 may be displayed by a software application running on client device 34A, or GUI 60 may be part of a software application being accessed by client device 34A through network 20 (e.g., software applications running at server system 24 or other suitable locations).

Promotional message 62 may provide information to user 32A regarding benefits of sharing application 35A. Promotional message 62 states that by sharing application 35A with others, those with whom user 32A shared application 35A may download and purchase the software application for half of the normal purchase price. In FIG. 3A, promotional message 62 is shown on a default screen of GUI 60. In other embodiments, GUI 60 may only display promotional message 62 after certain criteria have been met. Examples of such criteria include number of times using the software application, achieving a certain score or benchmark within the software application, bestowing a certain rating upon the software application, or other appropriate criteria. In one embodiment, GUI 60 may not show any promotional message 62. Promotional message 62 may be related to certain events or temporal occurrences such as holidays or sales. A software application developer of application 35A may create a promotional event (e.g., a "Christmas sale" event) and notify users via a message in application 35A. In various examples, the software application developer may notify users of promotional events by other methods, such as email, text message, or social network service entry or message. The software application developer may create such promotional events and publish this information to the application users him or herself, or, alternatively, a server (e.g., server system 24) may facilitate creation of such events by the software application developer and automatically publish messages to application 35A on client device 34A.

Buttons 68 may enable a user of application 35A to access different graphical user interfaces. In FIG. 3A, buttons 68 enable user 32A to rate the software application, share the software application, make in-application purchases, view high scores, and access other options, respectively. Various other software applications may provide different buttons with access to different features. Some of the graphical user interfaces accessible through buttons 68 may include options enabling a user to create user activity, and send associated information to sever system 24. For example, selection of button 68A, labeled "Rate", may prompt user 32A for input in relation to rating application 35A. After selecting a rating, user 32A may be asked if he or she would like to share this rating on one or more social network services.

Other buttons may display a GUI containing configuration options for application 35A. As one example, button 68E, labeled "More", may enable user 32A to associate application 35A with the user's various social network service accounts (i.e., by specifying a social network service and providing login credentials). Button 68E may further enable user 32A to configure or disable the automatic generation and sharing of user activity information by application 35A. That is, while disabled by default, applications 35 may be configurable by a user to allow the software application to generate and send user activity information automatically. As one example, application 35B may be an audio application. If configured by user 32B to allow for the automatic generation and sharing of user activity information, application 35B may generate and share information regarding what audio track is currently being played.

Figure 3B:
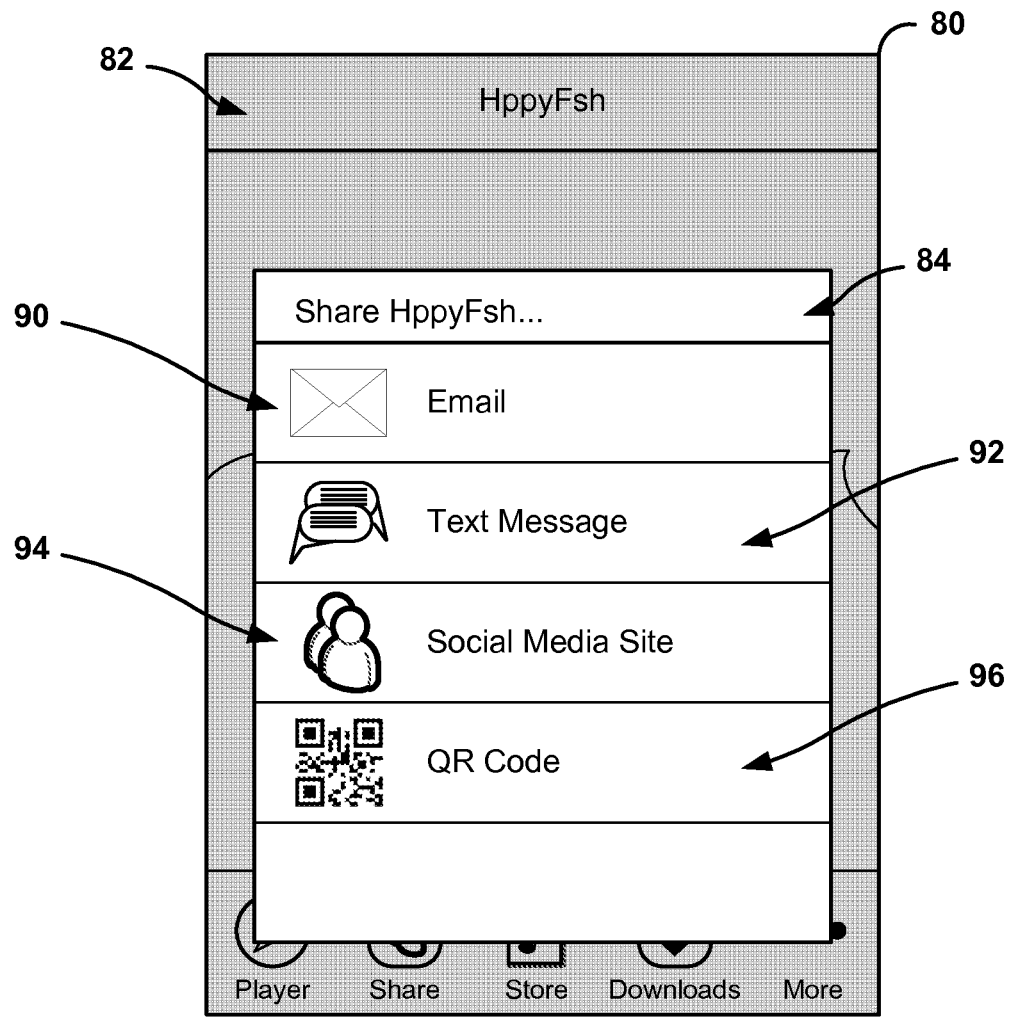
FIG. 3B is a screen illustration showing another example graphical user interface that includes modes for sharing a software application, in accordance with one or more aspects of the present disclosure.

By selecting button 68B, labeled "Share", user 32A may be presented with a GUI as shown in FIG. 3B. Using the GUI as shown in FIG. 3B, user 32A may be able to share or recommend application 35A to other users in accordance with one or more embodiments of the present disclosure.

FIG. 3B is a screen illustration showing another example graphical user interface that includes modes for sharing a software application, in accordance with one or more aspects of the present disclosure. For the purposes of illustration only, the example screen illustration is described below within the context of system 1 of FIG. 1, server system 24 of FIG. 2, and GUI 60 of FIG. 3A. As one example, FIG. 3B depicts GUI 80 that may be configured for a mobile device (e.g., client device 34A) and may comprise part of a software application for a mobile device (e.g., application 35A).

GUI 80 may provide another example of application 35A with an associated sharing module (e.g., sharing module 8A). GUI 80 may have background area 82 and sharing popup 84. Sharing popup 84 may further contain list options for different methods of sharing application 35A. List options of sharing popup 84 may include, for example, email option 90, text message option 92, social network service option 94, and Quick Reference Code (QR Code) option 96. GUI 80 may be displayed by a software application running on client device 34A, or GUI 80 may be part of a software application accessed by client device 34A through network 20.

Sharing popup 84 of GUI 80 may be accessed by a user (e.g., user 32A) through GUI 60 of FIG. 3A. For example, user 32A's selection of button 68B, labeled "Share", may cause application 35A to display sharing popup 84 as depicted in FIG. 3B. The various list options of sharing popup 84 may enable user 32A to share application 35A with one or more other users (e.g., users 2, 32B) by one or more means in accordance with the present disclosure. As one example, user 32A's selection of social network service option 94 may enable user 32A to create a social network activity entry at one or more social network services.

Before or upon user 32A's first selection of social network service option 94, sharing module 8A may request user association information from user 32A. A request for user association information may, in various examples, enable user 32A to specify with which users (e.g., social network contacts) certain user activity information is to be shared. In other words, the first time application 35A receives a selection of social network service option 94, sharing module 8A may require user 32A to authenticate him or herself to one or more social network services (e.g., by specifying one or more social network services and entering a login and password combination). Sharing module 8A may also require user 32A to provide a list or group of users with whom user 32A would like to share user activity information.

In some examples, sharing module 8A may not request user association information because user 32A may have previously been required to provide user association information (e.g., by selecting button 68E or by a previous selection of social network service option 94). In examples where sharing module 8A previously received user association information, selection of social network service option 94 may not cause sharing module 8A to request user association information. In other examples, sharing module 8A may always request user association information upon application 35A receiving a selection of social network service option 94. That is, sharing module 8A may remember user association information once it is input by user 32A, or sharing module 8A may request user association information in response to each selection of social network service option 94.

User 32A's selection of social network service option 94 may also cause sharing module 8A to request other input from user 32A. For example, sharing module 8A may ask user 32A if he or she would like to modify or add to the user activity information to be generated. In other examples, user 32A's selection of social network service option 94 may not cause sharing module 8A to request other input from user 32A. That is, selection of social network service option 94 may automatically generate user activity information. Whether or not sharing module 8A requires more user input from user 32A may be based on certain options or settings configurable by user 32A and accessible from GUI 60 of FIG. 3A. By default, sharing module 8A may allow user 32A to add to and/or confirm the user activity information by giving user 32A the opportunity to author part of the social network activity entry to be published by user activity server 26.

User activity information may then be sent to server system 24. In various examples, in addition to or instead of sending the user activity information to server system 24, the user activity information generated by sharing module 8A may be stored locally at client device 34A. User activity server 26 may use at least a portion of the user activity information received by server system 24 to create and publish a social network activities entry. Additionally, user activity server 26 may store the received user activity information and/or use it to establish partial referral associations.

Selection of other options from sharing popup 84 (i.e., email option 90, text message option 92, or QR Code option 96) may cause sharing module 8A to generate user activity information in a fashion similar to that described as a result of a user's selection of social network service option 94. As one example, a user (e.g., user 32A) may select email option 90. Upon receiving this selection, sharing module 8A of application 35A may generate user activity information and/or allow user 32A to author user activity information and send the user activity information to server system 24. Server system 24 and/or user activity server 26 may store user association information received from sharing module 8A, but may refrain from publishing a social network activity entry at a social network service based on the user association information. When user activity server 26 receives user activity information and/or user association information from sharing module 8A in response to a selection of email option 90, user activity server 26 may create a new referral association or modify an existing referral association with at least a portion of the received user activity information and/or user association information.

In addition to generating user association information for transmittal to server system 24, sharing module 8A may, in response to a selection of email option 90, interact with an email application of device 34A (not shown). Sharing module 8A may interact with the email application of device 34A to email at least a portion of the user activity information created by sharing module 8A and/or user 32A to other users (e.g., users 2, 32B). In other words, in response to a selection by user 32A of email option 90 in sharing popup 84, sharing module 8A of application 35A may send an email to users 2, 32B (as determined by the relevant user association information) with at least a portion of the user association information generated by sharing module 8A. The email sent by sharing module 8A and to users 2, 32B may include one or more of: (1) a user identifier (e.g., user name, identification code, etc.) that identifies a user that performed the user activity, (2) a software application identifier (e.g., title, developer name, identification code, etc.) that identifies a software application associated with the user activity, (3) an action identifier that identifies one or more actions (e.g., download, review, purchase, promote, rate, etc.) performed with respect to the software application, (4) a time identifier that identifies a time at which the one or more actions were performed, (5) a platform identifier that identifies a type of device (e.g., mobile phone, desktop computer, etc.) utilized to perform the one or more actions, (6) user association information (e.g., whom the user intends to share the user activity with), (7) other suitable information.

The portion of user association information included in the email sent by sharing module 8A may be directly accessible—that is, shown in or attached to the email—or, in other examples, it may be accessible by a hyperlink to an Internet website. In those examples where the email contains a hyperlink, the website may enable the recipient of the email (e.g., user 2) to access and/or download an instance of application 35A. This website may be created by user activity server 26 or any other suitable server device connected to network 20. By accessing this website and/or downloading an instance of application 35A, user 2 may provide certain user activity information, through network 20, to server system 24. User activity server 26 may use the user activity information in accordance with techniques of the present disclosure.

Selection of the text message option 92 may cause sharing module 8A generate user activity information, send the user activity information to server system 24, and also to interact with a text messaging application of device 34A (not shown). Sharing module 8A may interact with the text messaging application of device 34A to send a text message including at least a portion of the user activity information created by sharing module 8A to other users (e.g., users 2, 32B). The text message may directly include the user activity information, or may provide a hyperlink to an Internet website similar to that described with respect to a selection of email option 90.

Additionally, sharing module 8A may send the created user activity information to server system 24.

User 32A selecting QR Code option 96 may cause sharing module 8A to generate user activity information, send the user activity information to server system 24, and generate a QR code containing the user activity information. Alternatively, sharing module 8A may generate a QR code containing a hyperlink to an Internet website containing the user activity information. Application 35A may then display the generated QR code on a display of client device 34B. User 32A may then show the QR code to other users (e.g., user 32B). User 32B may use client device 34B to scan the QR code and obtain the user activity information.

Figure 4:
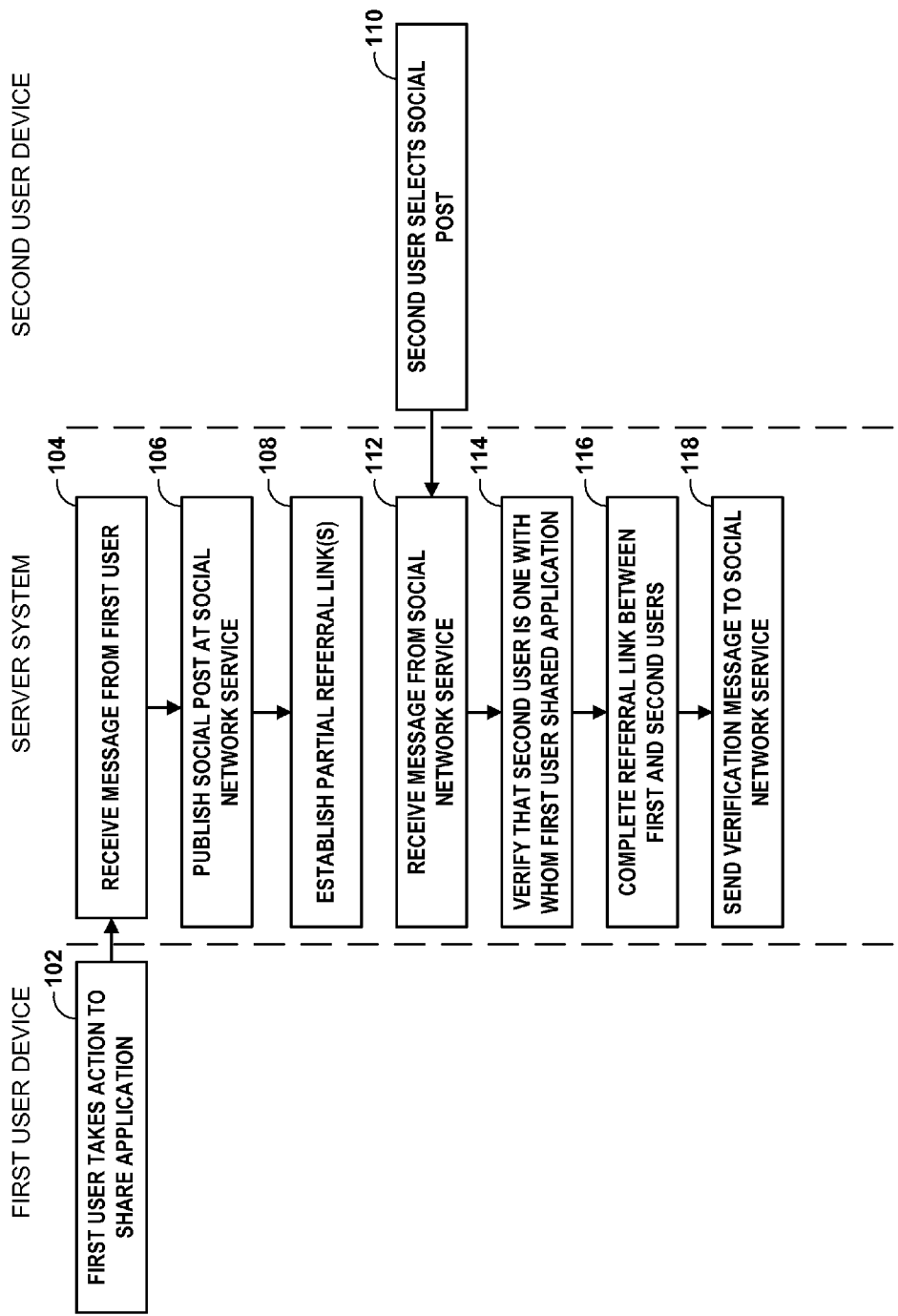
FIG. 4 is a flow diagram illustrating an example operation for managing referral information when sharing software applications using social network services, in accordance with one or more aspects of the present disclosure.

FIG. 4 is a flow diagram illustrating an example operation for managing referral information when sharing software applications using social network services, in accordance with one or more aspects of the present disclosure. FIG. 4 does not represent any requirement in the ordering of individual steps. For purposes of illustration only, the example mode of operation illustrated in FIG. 4 is described below within the context of system 1 of FIG. 1 and server system 24 of FIG. 2.

A first user (e.g., user 32A) may interact with an application (e.g., application 35A) of a first user device (e.g., client device 34A) and share application 35A (102). To share application 35A, sharing module 8A may send a message to a server system (e.g., server system 24). The message may include user activity information and user account information (e.g., corresponding to one or more social network services).

Server system 24 may receive the message from client device 34A (104). The message may include software application information identifying application 35A, user information identifying user 32A, and/or user association information identifying those users with whom user 32A intended to share the software application. In some examples, the message from client device 34A may also include user authentication for one or more social network services. In other examples, user authentication information for the social network service(s) may have been previously received and stored by server system 24. At least a portion of the information included in the message from client device 34A may be distributed by server system 24 to user activity server 26 as well as stored in the one or more storage devices 46.

In response to receiving the first message from client device 34A, server system 24 may publish a social post at one or more social network services (106). This may be performed by server system 24 or, more specifically, by user activity server 26. The social post may be based on user activity information received by server system 24 from client device 34A. As part of publishing the social post, user activity server 24 may utilize user authentication information received from client device 34A to authenticate with the one or more social network services. In various embodiments, the social post may include content generated by user 32A, application 35A, and/or user activity server 26. That is, the published social post may contain content authored by user 32A of client device 34A as well as content created by application 35A and/or user activity server 26.

Server system 24 may also establish a partial referral association (or multiple associations) based on receipt of the message from client device 34A (108). This may be performed by server system 24 or, more specifically, by user activity server 26. The partial referral association(s) may be created based at least in part on the user activity information received by server system 24 from client device 34A. As one example, a partial referral association may include one or more of (1) a user identifier (e.g., user name, identification code, etc.) that identifies user 32A, (2) a software application identifier (e.g., title, developer name, identification code, etc.) that identifies application 35A, (3) an action identifier that identifies one or more actions (e.g., download, review, purchase, promote, rate, etc.) performed by user 32A with respect to application 35A, (4) a time identifier that identifies a time at which the one or more actions were performed, (5) a platform identifier that identifies the type of device (e.g., client device 34A) utilized to perform the one or more actions, (6) user association information (e.g., whom user 32A intends to share the user activity with), (7) other suitable information. The partial referral association(s) may be stored in the one or more storage devices 46.

A second user (e.g., user 2) may interact with a software application of a second device (e.g., client device 4) to select the social post published at one of the one or more social network services (110). User 2 may use a social application (e.g., application 6) on client device 4 to access one or more social network services and view the social post published by user activity server 26 in response to receipt of the message from user 32A. Application 6 may be software executing on client device 4, or may be software executing at another suitable location and displayed at client device 4 through network 20. Application 6 may enable user 2 to preview a number of social posts. Additionally, Application 6 may allow user 2 to view a social post by selecting it. Selection may be accomplished by user 2 touching, clicking on, or otherwise identifying the social post in accordance with the operation of client device 4.

In response to the selection of the social post by user 2, server system 24 may receive a message from the social network service (112). The message received from the social network service may contain user activity information generated by the social network service relating to user 2's selection of the social post. While FIG. 4 describes this message as being received from a social network service, the present disclosure also contemplates server system 24 receiving the message from client device 4. Server system 24 may store the user activity information contained in the message received from the social network service in the one or more storage devices 46. Additionally, server system 24 may distribute this information to user activity server 26.

Server system 24 may verify that the second user is one with whom the first user shared the software application (114). More specifically, user activity server 26 may utilize the user association information received in the message from the first user to determine whether user 2 was one of the users with whom user 32A shared application 35A.

Upon verifying that user 2 is one of the users with whom user 32A shared application 35A, server system 24 may complete a referral association between users 32A and 2 (116). This may be done by server system 24 or, more specifically, by user activity server 26. The completed referral association may include user activity information received from client device 34A pertaining to user 32A and user activity information received from the social network service pertaining to user 2. The completed referral association may be stored by server system 24 or user activity server 26 in the one or more storage devices 46.

Server system 24 may also send a verification message to the social network service (118). The verification message from server system 24 to the social network service may contain information informing the social network service that user 2 is authorized to view and/or access the social post published by user activity server 26. In one example, the social network service may use this message to determine, upon a selection by user 2, whether to direct user 2 to a location allowing user 2 to download a version of application 35A having a reduced purchase price, or to a general location allowing user 2 to download a regularly priced version of application 35A. In other examples, the social network service may only store the information included in the verification message from server system 24.

Figure 5:
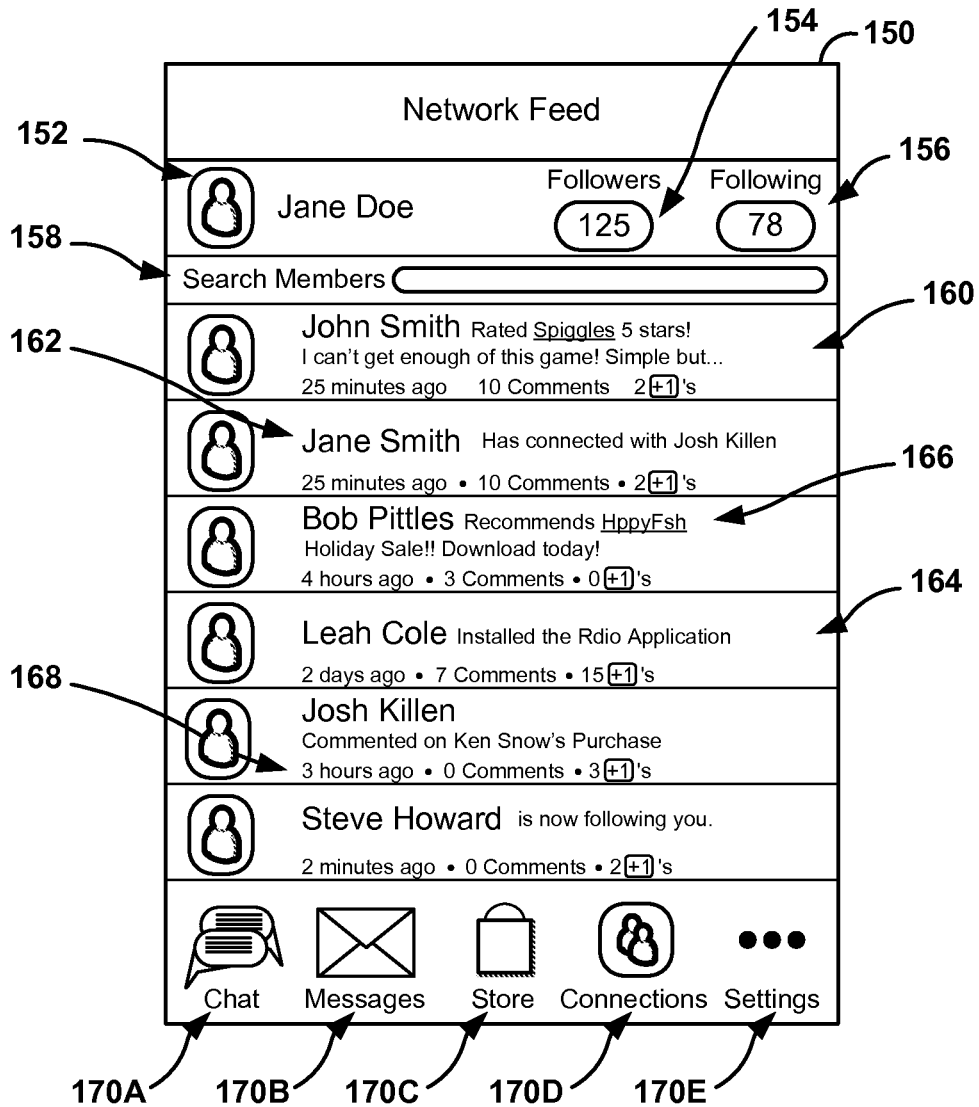
FIG. 5 is a screen illustration showing an example graphical user interface that includes published shares of software applications, in accordance with one or more aspects of the present disclosure.

FIG. 5 is a screen illustration showing an example graphical user interface that includes published shares of software applications, in accordance with one or more aspects of the present disclosure. For purposes of illustration only, the example screen illustration is described below within the context of system 1 of FIG. 1. As one example, FIG. 5 depicts a GUI 150 that may be configured for a mobile device (e.g., client device 4) and may comprise part of a software application for a mobile device (e.g., social application 6).

GUI 150 provides an example of user activity information that may be published to a user activity feed presented on a graphical display of a client. GUI 150 shows for a given user 152, a user activity feed that comprises user activity information generated in response to user activity of other users having an associational relationship with the user. For example, GUI 150 includes follower information 154, following information 156, search box 158, and user activity entries 160. User 152 may provide a profile picture to include in GUI 150 that may be displayed when user 152 views GUI 150 and may also be included in user activity entries 160 that include user activity information based on actions associated with user 152.

User 152 may select one or more other users to follow and may be followed by one or more other users. To follow another user means to subscribe to or otherwise receive user activity information for the other user. To be followed by another user means that the other user receives user activity information generated based on actions associated with user 152. GUI 150 may include a graphical and/or textual indication of a number of users following user 152 (i.e., followers 154) and a number of users that user 152 is following (i.e., following 156).

Each user activity entry 160 may include one or more of a user identifier 162, an action identifier 164, a software application identifier 166, and an activity status indicator 168 for a given user. User identifier 162 may include a name of a user and a picture or other image selected by the user. Action identifier 164 includes information about how the user (e.g., user 162) interacted with the software application and/or other information describing a user activity. For example, in the first user activity entry 160, action identifier 164 indicates that John Smith "Rated Spiggles 5 stars!". In the second user activity entry 160, action identifier 164 indicates that Jane Smith connected with Josh Killen. In some examples, user activity entry 160 includes software application identifier 166 that indicates a particular software application associated with action identifier 164 (e.g., the Rdio application was installed by Leah Cole). Software application identifier 166 may include a link to a store where a user can purchase the software application or link to additional information about the software application. The link included in software application identifier 166 may direct user 162 to different locations, depending on whether user activity entry 160 includes any incentive eligibility criteria and whether user 162 meets at least one of the incentive eligibility criteria. Activity status indicator 168 includes information about when the user activity occurred (i.e., "3 hours ago"), whether any users have commented on the user activity (i.e., "0 comments"), and whether any users have +1'd the user activity (i.e., "3 +1's").

GUI 150 may also include buttons 170A-E that may enable a user (e.g., user 152) to cause different graphical user interfaces to be displayed and perform different actions. For example, activation of button 170A may cause a chat interface to be displayed that may enable a user to chat with other social network users. Activation of button 170B may cause a social network service interface to be displayed that may enable a user to view, compose, and exchange messages with other users. Activating button 170C may cause a store interface to be displayed that may enable a user to preview, purchase, and download additional software applications. Activating button 170D may cause a connections interface to be displayed that includes information about other users of the social network service (i.e., those users of whom user 152 is a follower or by whom user 152 is being followed). Activating button 170E may cause other interfaces to be displayed that may enable a user to perform additional functions. For example, a configuration interface may be displayed that enables a user to configure user account information and manage the distribution of user activity information associated with the user.

While not depicted in FIG. 5, GUI 150 may further include a software application platform identifier to indicate that software application identifier 166 was purchased via a particular platform, such as Android, for example. In at least some implementations, user activity information may be presented as hyperlinks that enable a user to select the hyperlink to access additional information. For example, a software application identifier may be selected by a user to purchase and/or download the software application identified by the software application identifier. Selectable icons may also be presented to enable users to access additional information or purchase software applications.

Figure 6:
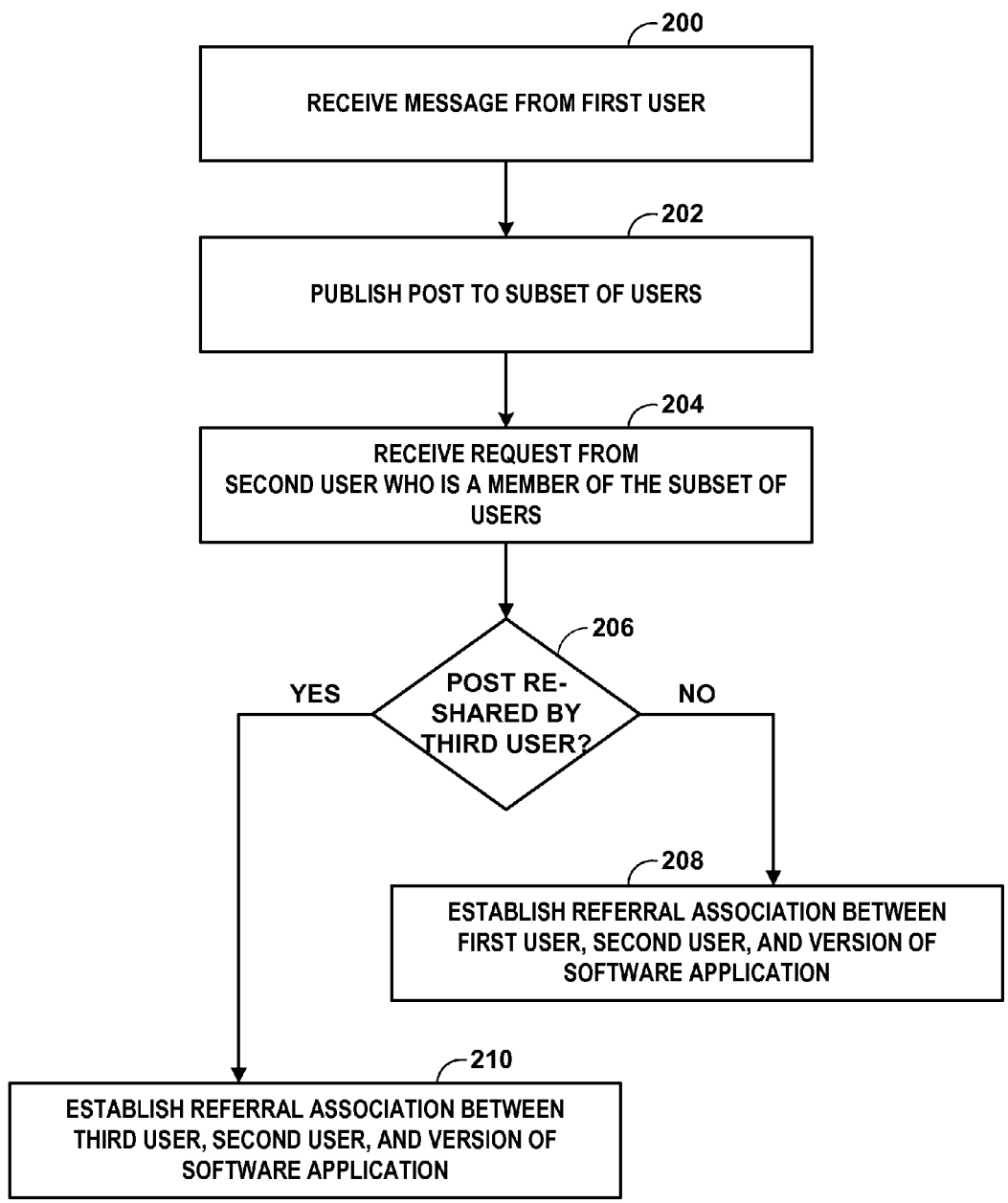
FIG. 6 is a flow diagram illustrating an example process that may be used to manage a sharing of software applications using social network services, in accordance with one or more aspects of the present disclosure.

FIG. 6 is a flow diagram illustrating an example process that may be used to manage a sharing of software applications using social network services, in accordance with one or more aspects of the present disclosure. For purposes of illustration only, the example method illustrated in FIG. 6 is described below within the context of system 1 of FIG. 1, and server system 24 of FIG. 2. The example process described below may be performed by server system 24 shown in FIG. 2.

The process of FIG. 6 includes receiving, by a server system and from a computing device associated with a first user, a message that includes (1) user association information and (2) an indication of a software application executable by the computing device, wherein the user association information identifies a subset of users (200). The process of FIG. 6 also includes publishing, by the server system, a post to the subset of users indicated by the user association information, wherein the post is based at least in part on the message (202). The process further includes receiving, by the server system, a request for a version of the software application from a second user who is a member of the subset of users (204). The process includes determining whether the post was re-shared by a third user (206). The process also includes, responsive to determining that the post was not re-shared by the third user ("NO" branch of 206), storing, in a database of the server system, a referral association between the first user, the second user, and the version of the software application (208). Finally, the process includes, responsive to determining that the post was re-shared by the third user ("YES" branch of 206), storing, in the database, a referral association between the third user, the second user, and the version of the software application (210).

In one example, the process also includes, responsive to a device associated with the second user downloading a version of the software application from the post, updating the referral association to include an indication that the second user downloaded a version of the software application.

In one example, the process also includes receiving, from a device associated with the second user, a message indicating that the second user has installed a version of the software application, and updating the referral association to include an indication that the second user installed a version of the software application.

In one example, the process also includes receiving, by the server system, a request for a version of the software application from a fourth user who is not a member of the subset of users, and refraining from storing a referral association between the first user, the fourth user, and the software application.

In one example, the process also includes receiving, by the server system, one or more incentive eligibility criteria, determining that the request for a version of the software application satisfies at least one of the incentive eligibility criteria, and providing a referral incentive to at least one of the first user, the second user, and the third user. The incentive eligibility criteria may include a maximum number of referral incentives, a group of users eligible for the referral incentive, or a minimum number of referrals required prior to the first user being eligible for the referral incentive.

In one example, the process also includes receiving, by the server system, one or more incentive eligibility criteria, determining that the request for a version of the software application satisfies at least one of the incentive eligibility criteria, and validating the referral association.

In one example, the process also includes, prior to receiving the request for a version of the software application, receiving, by the server system and from a device associated with a software application developer of the software application, one or more changes to at least one of one or more incentive eligibility criteria established after publishing the post, updating the one or more incentive eligibility criteria to incorporate the one or more changes, determining that the request satisfies at least one of the incentive eligibility criteria, and providing a referral incentive to at least one of the first user, the second user, and the third user.

In one example, the process also includes, prior to receiving the message from the computing device, receiving, by the server system and from the computing device, authentication information associated with the first user, authenticating, based at least in part on the authentication information, the first user at the server system, and publishing the post at a user account associated with the first user.

In one example, the process further includes storing the referral association in a database, the database further comprising other referral associations for a plurality of software applications, aggregating, by the server system, referral associations associated with the software application, and providing information regarding the aggregated referral associations to a device associated with a software application developer of the software application.

In one example, the process further includes storing the referral association in a database, the database further comprising other referral associations for a plurality of software applications, aggregating, by the server system, referral associations associated with the software application, and providing information regarding the aggregated referral associations to a device associated with an advertiser associated with the software application.

In one example, wherein the message further includes user activity information, the process also includes updating the referral association to include the user activity information, and providing a device associated with a software application developer of the software application with the updated referral association.

In one example, the server system enables each of a plurality of users to associate a profile with a user account and publish posts to one or more of the plurality of users.

In one example, publishing the post to the subset of users includes identifying a first portion of users of the subset of users who have not previously installed the application on a respective device associated with one of the first portion of users, identifying a second portion of users of the subset of users who previously installed the application on a respective device associated with one of the second portion of users, publishing, by the server system, the post to the first portion of users who have not previously installed the software application, and refraining from publishing the post to the second portion of users who previously installed the software application.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
receiving, by a server system and from a computing device associated with a first user, a message that includes (1) user association information and (2) an indication of a software application executable by the computing device, wherein the user association information identifies a subset of users;
publishing, by the server system, a post to the subset of users indicated by the user association information, wherein the post is based at least in part on the message;
receiving, by the server system, a request for a version of the software application from a second user who is a member of the subset of users;
determining whether the post was re-shared by a third user;
responsive to determining that the post was not re-shared by the third user, storing, in a database of the server system, a referral association between the first user, the second user, and the version of the software application; and
responsive to determining that the post was re-shared by the third user, storing, in the database, a referral association between the third user, the second user, and the version of the software application.

2. The method of claim 1, further comprising:
responsive to a device associated with the second user downloading a version of the software application from the post, updating the referral association to include an indication that the second user downloaded a version of the software application.

3. The method of claim 1, further comprising:
receiving, from a device associated with the second user, a message indicating that the second user has installed a version of the software application; and
updating the referral association to include an indication that the second user installed a version of the software application.

4. The method of claim 1, further comprising:
receiving, by the server system, a request for a version of the software application from a fourth user who is not a member of the subset of users; and
refraining from storing a referral association between the first user, the fourth user, and the version of the software application.

5. The method of claim 1, further comprising:
receiving, by the server system, one or more incentive eligibility criteria;
determining that the request for a version of the software application satisfies at least one of the incentive eligibility criteria; and
providing a referral incentive to at least one of the first user, the second user, and the third user.

6. The method of claim 5, wherein the incentive eligibility criteria comprise a maximum number of referral incentives, a group of users eligible for the referral incentive, or a minimum number of referrals required prior to the first user being eligible for the referral incentive.

7. The method of claim 1, further comprising:
receiving, by the server system, one or more incentive eligibility criteria;
determining that the request for a version of the software application satisfies at least one of the incentive eligibility criteria; and
validating the referral association.

8. The method of claim 1, further comprising:
prior to receiving the request for a version of the software application, receiving, by the server system and from a device associated with a software application developer of the software application, one or more changes to at least one of one or more incentive eligibility criteria established after publishing the post;
updating the one or more incentive eligibility criteria to incorporate the one or more changes;
determining that the request satisfies at least one of the incentive eligibility criteria; and
providing a referral incentive to at least one of the first user, the second user, and the third user.

9. The method of claim 1, further comprising:
prior to receiving the message from the computing device, receiving, by the server system and from the computing device, authentication information associated with the first user;
authenticating, based at least in part on the authentication information, the first user at the server system; and
publishing the post at a user account associated with the first user.

10. The method of claim 1, further comprising:
storing the referral association in a database, the database further comprising other referral associations for a plurality of software applications;
aggregating, by the server system, referral associations associated with the software application; and
providing information regarding the aggregated referral associations to a device associated with a software application developer of the software application.

11. The method of claim 1, further comprising:
storing the referral association in a database, the database further comprising other referral associations for a plurality of software applications;
aggregating, by the server system, referral associations associated with the software application; and
providing information regarding the aggregated referral associations to a device associated with an advertiser associated with the software application.

12. The method of claim 1, wherein the message further includes user activity information, the method further comprising:
updating the referral association to include the user activity information; and
providing a device associated with a software application developer of the software application with the updated referral association.

13. The method of claim 1, wherein the server system enables each of a plurality of users to associate a profile with a user account and publish posts to one or more of the plurality of users.

14. The method of claim 1, wherein publishing the post to the subset of users comprises:
identifying a first portion of users of the subset of users who have not previously installed the application on a respective device associated with one of the first portion of users;
identifying a second portion of users of the subset of users who previously installed the application on a respective device associated with one of the second portion of users;
publishing, by the server system, the post to the first portion of users who have not previously installed the software application; and
refraining from publishing the post to the second portion of users who previously installed the software application.

15. A server system comprising:
one or more computing devices each including one or more processors;
a database stored in a memory; and
at least one application operable by the one or more processors of at least one of the one or more computing devices to:
receive, from a computing device associated with a first user, a message that includes (1) user association information and (2) an indication of a software application executable by the computing device, wherein the user association information identifies a subset of users;
publish a post to the subset of users indicated by the user association information, wherein the post is based at least in part on the message;
receive one or more eligibility criteria;
receive a request for a version of the software application from a second user who is a member of the subset of users;
determine that the request for a version of the software application satisfies at least one eligibility criterion of the one or more eligibility criteria;
determine whether the post was re-shared by a third user;
responsive to determining that the post was not re-shared by the third user, store, in the database, a referral association between the first user, the second user, and the version of the software application; and
responsive to determining that the post was re-shared by the third user, store, in the database, a referral association between the third user, the second user, and the version of the software application.

16. The system of claim 15, wherein the database includes other referral associations for a plurality of software applications, the at least one application being further operable by the one or more processors of at least one of the one or more computing devices to:
aggregate referral associations associated with the software application; and
provide information regarding the aggregated referral associations to a device associated with a software application developer of the first software application.

17. The system of claim 15, wherein the at least one application is further operable by the one or more processors of the at least one of the one or more computing devices to:
responsive to a device associated with the second user downloading a version of the software application from the post, update the referral association to include an indication that the second user downloaded a version of the software application.

18. A computer-readable storage device comprising instructions that, when executed, cause one or more processors of a server system to perform operations including:
receiving, by the server system and from a computing device associated with a first user, a message that includes (1) user association information and (2) an indication of a software application executable by the computing device, wherein the user association information identifies a subset of users;

publishing, by the server system, a post to the subset of users indicated by the user association information, wherein the post is based at least in part on the message;

receiving, by the server system, a request for a version of the software application from a second user who is a member of the subset of users;

determining whether the post was re-shared by a third user;

responsive to determining that the post was not re-shared by the third user, storing, in a database of the server system, a referral association between the first user, the second user, and the version of the software application; and responsive to determining that the post was re-shared by the third user, storing, in the database, a referral association between the third user, the second user, and the version of the software application.

19. The computer-readable storage device of claim 18, wherein the operations further include:

receiving, by the server system, one or more incentive eligibility criteria;

determining that the request for a version of the software application satisfies at least one of the incentive eligibility criteria; and providing a referral incentive to at least one of the first user, the second user, and the third user.

20. The computer-readable storage device medium of claim 18, wherein the operations further include:

responsive to a device associated with the second user downloading a version of the software application from the post, updating the referral association to include an indication that the second user downloaded a version of the software application.

* * * * *